(No Model.)
D. SOMMER.
LISTED CORN CULTIVATOR.
No. 352,274. Patented Nov. 9, 1886.
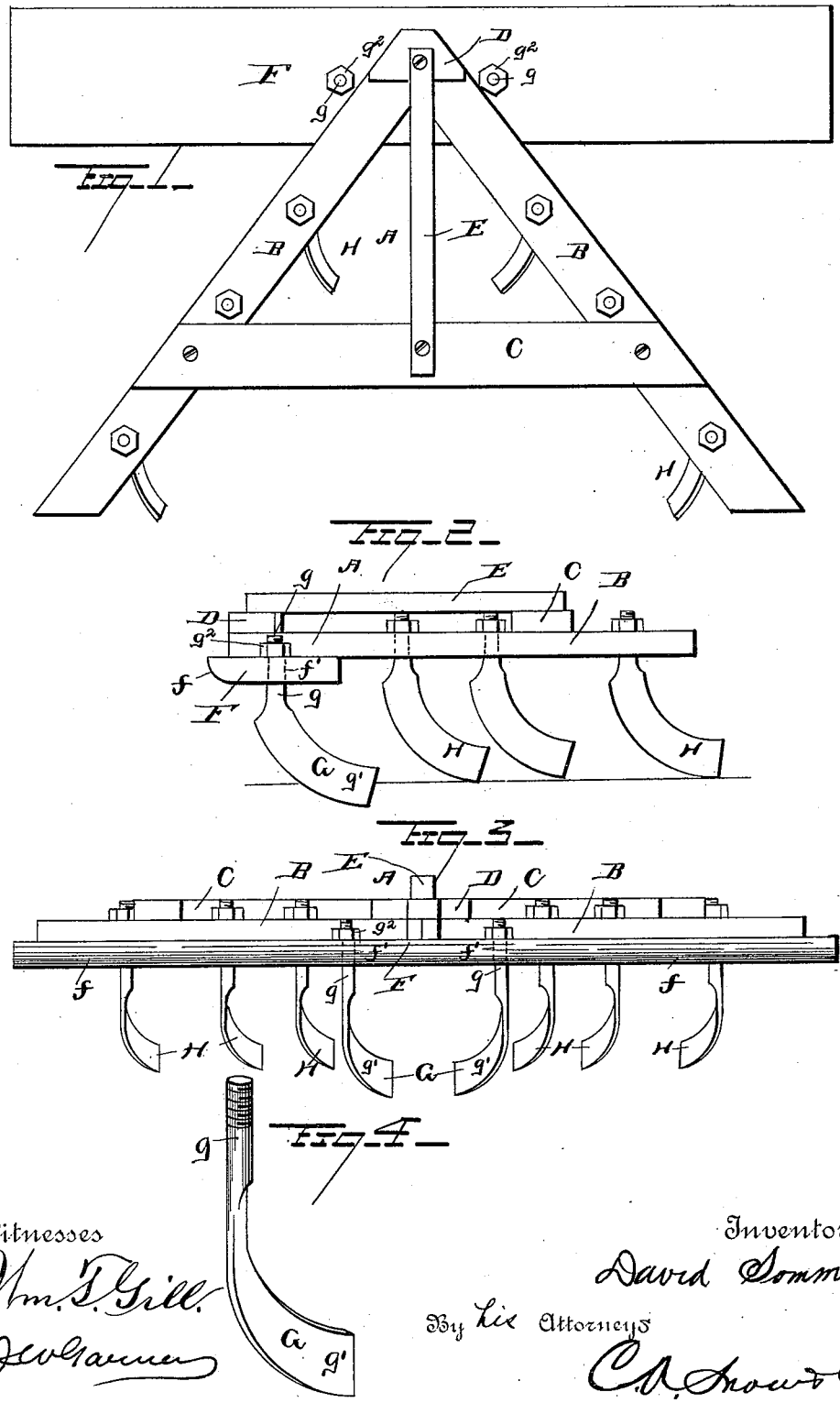

UNITED STATES PATENT OFFICE.

DAVID SOMMER, OF ABILENE, KANSAS.

LISTED-CORN CULTIVATOR.

SPECIFICATION forming part of Letters Patent No. 352,274, dated November 9, 1886.

Application filed June 26, 1886. Serial No. 206,356. (No model.)

*To all whom it may concern:*

Be it known that I, DAVID SOMMER, a citizen of the United States, residing at Abilene, in the county of Dickinson and State of Kansas, have invented new and useful Improvements in Listed - Corn Cultivators, of which the following is a specification.

My invention relates to an improvement in listed-corn cultivators; and it consists in the peculiar construction and arrangement of devices, that will be more fully set forth hereinafter, and particularly pointed out in the claims.

In the drawings, Figure 1 is a top plan view of a listed-corn cultivator embodying my improvements. Fig. 2 is a side elevation of the same. Fig. 3 is a front elevation. Fig. 4 is a detail perspective view of one of the cultivator-teeth.

A represents a V-shaped frame, comprising the diagonal bars B, which are united together at their front ends, and are connected near their rear ends by a cross-bar, C. A block, D, is placed on the upper side of the front jointed ends of the beams B, and the tongue E has its rear end secured to the center of the bar C, the said tongue being also secured on the block D.

F represents a transverse bar, which is connected at its center to the under sides of the front ends of the beams B. The ends of the bar F extend laterally beyond the front ends of the beams B, and the said bar has its front under side rounded, as at $f$. Openings $f'$ are made in the bar F, one on each side of the front end of the frame A, and through the said openings pass the vertical upwardly-projecting shanks $g$ of cultivating-teeth G. The said teeth are made of spring - plate metal and curved rearwardly and inwardly toward each other, thereby forming the resilient curved blades $g'$. The upper ends of the shanks $g$ are screw-threaded to receive nuts $g^2$, which bear upon the upper side of the bar F, and secure the teeth G firmly thereto.

H represents a series of cultivator - teeth, which are similar in construction to the teeth G, the said teeth H being secured to the rearwardly-diverging beams B.

The teeth G are longer than the teeth H, and are thereby adapted to extend to the bottom of the listed furrow and work on opposite sides of the row of corn.

The operation of my invention is as follows: A team is hitched to the tongue and the cultivator is drawn along the listed furrow. The teeth G, at the front end of the cultivator, work the ground in the bottom of the furrow, and in the immediate vicinity of the row of corn, and the laterally-diverging follower-teeth H cultivate the sides of the furrow. As the said teeth G and H have their rear curved ends turned inwardly, it will be seen that the earth as it is loosened is thrown toward the corn in the center of the furrow, and each succeeding tooth H is so located with respect to the preceding tooth as to throw the dirt stirred by it into the furrow cut by the preceding tooth, thus thoroughly stirring and working the soil on the sides of the furrow. The function of the bar F is to crush the clods on the ridges at opposite sides of the furrow, and, in connection with the teeth or blades, to nearly level the same.

A listed-corn cultivator thus constructed is adapted to be used for cultivating the corn when the plants are very small, thus insuring them a rapid growth from the start and assisting the grain to mature early in the season.

Having thus described my invention, I claim—

The listed-corn cultivator comprising the diverging beams B, the beam C, connecting the said beams B, the transverse leveling-beam F, attached to the front ends of the beams B, on the under side thereof, the inwardly-curved teeth H, attached to the diverging beams B, and the inwardly-curved teeth G, attached to the beam F, near the beams B, the said latter teeth, G, extending deeper than the teeth H, substantially as described.

In testimony that I claim the foregoing as my own I have hereto affixed my signature in presence of two witnesses.

DAVID SOMMER.

Witnesses:
J. F. SECHRIST,
J. S. ZOOK.